(12) United States Patent
Valente

(10) Patent No.: US 8,475,564 B2
(45) Date of Patent: Jul. 2, 2013

(54) BIOMASS DRYER/BURNER SYSTEM

(76) Inventor: Peter Valente, Lasalle (CA)

( * ) Notice: Subject to any disclaimer, the term of this patent is extended or adjusted under 35 U.S.C. 154(b) by 419 days.

(21) Appl. No.: 12/701,795

(22) Filed: Feb. 8, 2010

(65) Prior Publication Data

US 2010/0202949 A1    Aug. 12, 2010

Related U.S. Application Data

(60) Provisional application No. 61/151,229, filed on Feb. 10, 2009.

(51) Int. Cl.
*B01D 53/14*    (2006.01)
(52) U.S. Cl.
USPC .................................. 95/11; 95/196; 96/240
(58) Field of Classification Search
USPC .............. 95/1, 12–13, 149, 214, 219; 96/189, 96/156, 174, 53, 244, 361, 362–365, 301; 423/246
See application file for complete search history.

(56) References Cited

U.S. PATENT DOCUMENTS

| | | | | |
|---|---|---|---|---|
| 1,169,764 | A * | 2/1916 | Brassert | 95/217 |
| 1,483,348 | A * | 2/1924 | Wetherbee et al. | 95/219 |
| 2,787,454 | A * | 4/1957 | Coppola | 261/122.1 |
| 3,726,239 | A |  4/1973 | Burbach | |
| 4,245,569 | A * | 1/1981 | Fallon, III | 110/215 |
| 5,354,364 | A | 10/1994 | Johnson et al. | |
| 7,347,889 | B2 * | 3/2008 | Matsuura et al. | 96/389 |
| 2006/0048920 | A1 * | 3/2006 | Helleur | 165/108 |
| 2006/0213370 | A1 * | 9/2006 | Leonard et al. | 96/243 |
| 2007/0014706 | A1 | 1/2007 | Herden et al. | |

FOREIGN PATENT DOCUMENTS

CA    1263518 A1    12/1989

* cited by examiner

*Primary Examiner* — Duane Smith
*Assistant Examiner* — Minh-Chau Pham
(74) *Attorney, Agent, or Firm* — Gifford, Krass, Sprinkle, Anderson & Citkowski, P.C.

(57) ABSTRACT

The present invention provides a biomass dryer/burner having an air cleaning apparatus adapted to accept emissions from the biomass dryer/burner and to convert said emissions to clean air to meet government emission standards. The biomass dryer/burner unit includes a dryer adapted to dry biomass, such as demolition waste or cut trees. The biomass dryer/burner unit optionally including a burner adapted to burn biomass. The biomass dryer/burner further producing emissions requiring cleaning before exhausting to the atmosphere. The air cleaning apparatus including a spray scrubber fluidly connected to the biomass dryer/burner adapted to moisten emissions, a recirculation tank in fluid communication with a collection tank, and the recirculation tank further having a sensor adapted to measure contaminant levels contained within the recirculation air filtration system. The sensor contained within the recirculation tank measures levels of carbon monoxide. If the air contained within the recirculation air filtration system measures above a predetermined contaminant level, then the air contained within the recirculation air filtration system is directed back into the spray scrubber. If the air contained within the recirculation air filtration system is below a predetermined level, then the air is exhausted into the atmosphere.

4 Claims, 2 Drawing Sheets

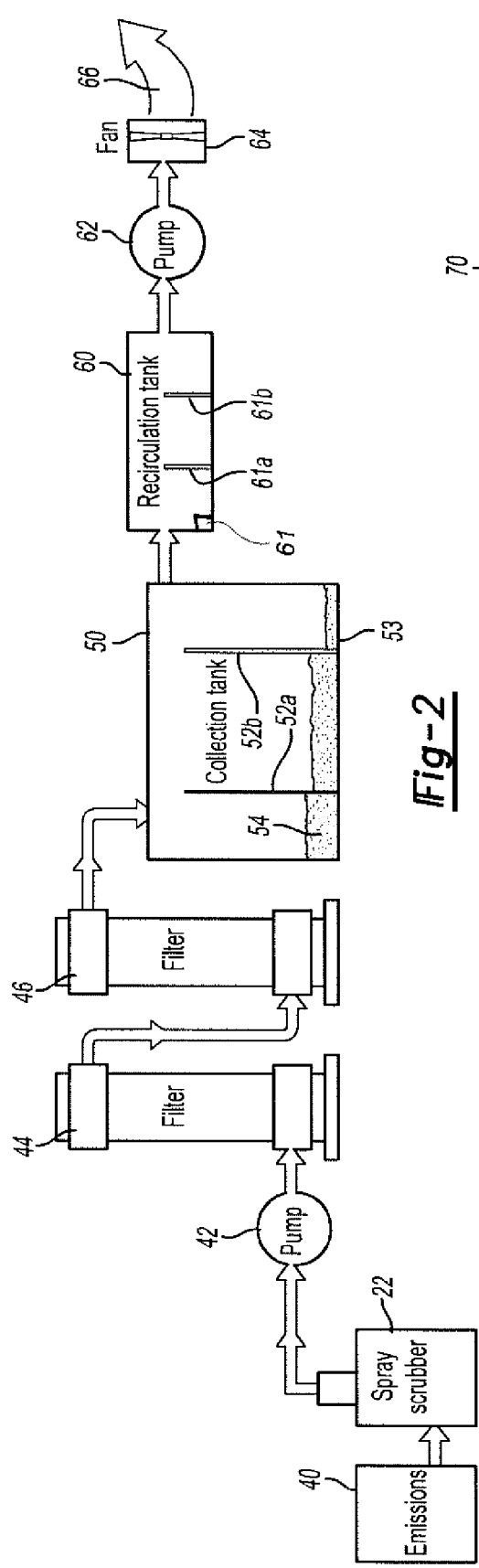
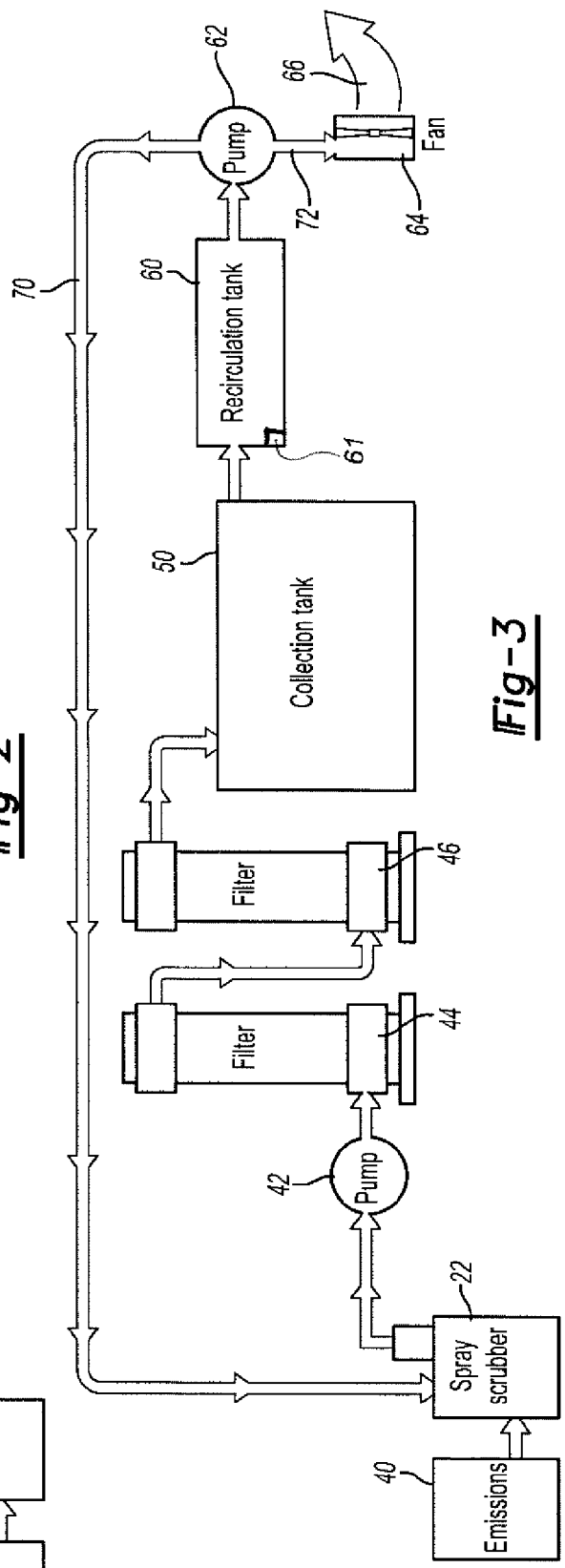
Fig-2
Fig-3

BIOMASS DRYER/BURNER SYSTEM

CROSS-REFERENCE TO RELATED APPLICATIONS

This application claims priority of U.S. Provisional Patent Application Ser. No. 61/151,229 filed Feb. 10, 2009, which is incorporated herein by reference.

FIELD OF THE INVENTION

The present invention relates to air treatment. In particular this invention relates to the treatment of emissions from a biomass dryer/burner system.

BACKGROUND OF THE INVENTION

The burning of biomass in the form of construction and demolition wood residue and wood generated from logging and pest control activities has been a substantial increase over the past several years. As the cost of fossil fuels (e.g. fuel oil, bunker oil, and natural gas) has increased, many large-scale users of these fossil fuels have looked to biomass as an alternative to provide a cost-effective fuel to supply their energy needs.

Large scale commercial greenhouses in particular have been on the forefront of the conversion to biomass fuel as a replacement for natural gas and bunker oil which have historically been used to generate hot water which in turn is used to provide heat to their greenhouses during the seasonal heating season. Primary sources of biomass used in the greenhouse industry are organic materials such as construction and demolition wood waste, clean wood, farm waste such as tomato vines, yard waste from trees, grass clippings and bushes, furniture and green wood generated from the removal of trees.

Additionally, recent interest has been expressed in the development of small to midsize electrical generation plants which would use wood waste from logging operations to provide steam for the operation of the facility's steam turbines.

While the conversion of large scale heating systems in electrical generating facilities to biomass as a fuel is primarily driven by cost savings realized from using biomass versus fossil fuels, there are also significant environmental benefits to this conversion. Biomass is typically seen as a carbon-neutral fuel while fossil fuels are significant contributors to global warming through the release of greenhouse gases.

Many large scale energy users have already made the conversion to biomass fuel in the form of residual wood. However, these conversions have typically been made without adequate research, and problems associated with the conversion process have resulted in the project owner not fully realizing the cost savings in environmental benefits that are anticipated to result from the conversion. The major problems encountered include the ability to source "dry wood" as a biomass fuel supply, inappropriately designed combustion units, and inefficient pollution control equipment to control emissions from biomass combustion.

Wood removed under this program is chipped and used in biomass burners without adequate seasoning to allow the wood to dry out. Green wood has a moisture content of up to 80% while seasoned wood has a moisture content of between 20-25%. Burning of green wood results in a significantly reduced energy of the biomass burner which in turn results in fouling of the combustion unit from creosote buildup and increased atmosphere pollution associated with the burning of biomass. Accordingly, it would be advantageous to develop an air emissions control method and apparatus to be used in connection with a biomass dryer/burner system for drying and burning green wood.

A previously known air filtration system for a biomass dryer/burners is known as a bag system. A bag system is comprised of a plurality of filters, each filter operable to remove particles from dry air. Previously known bag systems are not capable of cleaning moist air, or an air/water mixture. Bag systems are only capable of filtering emissions from a biomass dryer/burner system emitting dry air emissions.

While the conversion from fossil fuels to biomass often results in cost savings and environmental benefits, the environmental benefits are not realized unless the emissions from the biomass burner are neutralized to government air emission standards. Accordingly, it would be advantageous to develop an air emissions control method and apparatus to be used in connection with a biomass dryer/burner system which enables the scrubbing of an air/water mixture.

SUMMARY OF THE INVENTION

The present invention provides a biomass dryer/burner having an air cleaning apparatus adapted to accept emissions from a biomass dryer/burner and to convert said emissions to clean air to meet government emission standards. The biomass dryer/burner unit includes a burner adapted to dry biomass, such as demolition waste or cut trees. The biomass dryer/burner further includes a dryer, the dryer adapted to contain wet product to be dried. The biomass dryer/burner system as a whole producing emissions from the dryer from the act of drying the biomass and further producing emissions from the burner from the act of burning the biomass. The air cleaning apparatus including a spray scrubber fluidly connected to the biomass dryer. The spray scrubber having a spray mechanism adapted to moisten the emissions from the biomass dryer/burner. Alternatively, the spray scrubber having a pool of water or chemicals wherein the emissions are forced through the pool of water or chemicals. The air cleaning apparatus further including a recirculation air filtration system fluidly connected to the spray scrubber. The recirculation air filtration system having at least one filter, a collection tank, and a recirculation tank. The collection tank further provided with a floor contained therein, allowing sediment to settle on the floor of the collection tank. The recirculation tank is in fluid communication with the collection tank, and the recirculation tank further having a sensor adapted to measure contaminant levels contained within the recirculation air filtration system. The sensor contained within the recirculation tank measures levels of carbon monoxide. If the air contained within the recirculation air filtration system measures above a predetermined contaminant level, then the air contained within the recirculation air filtration system is directed back into the spray scrubber. If the air contained within the recirculation air filtration system is below a predetermined level, then the air is exhausted into the atmosphere. The recirculation air filtration system as a whole is pressurized. The recirculation air filtration system further includes a plurality of pressure gauges and pressure release valves. The air/water mixture is pumped through the recirculation air filtration system by a series of at least one pump.

BRIEF DESCRIPTION OF THE DRAWINGS

FIG. 2 is a recirculation air filtration system wherein contaminant levels are below the predetermined threshold; and FIG. 3 is a diagram showing the recirculation air filtration system wherein contaminant levels are above a predetermined threshold.

DETAILED DESCRIPTION OF THE INVENTION

Figure 1:
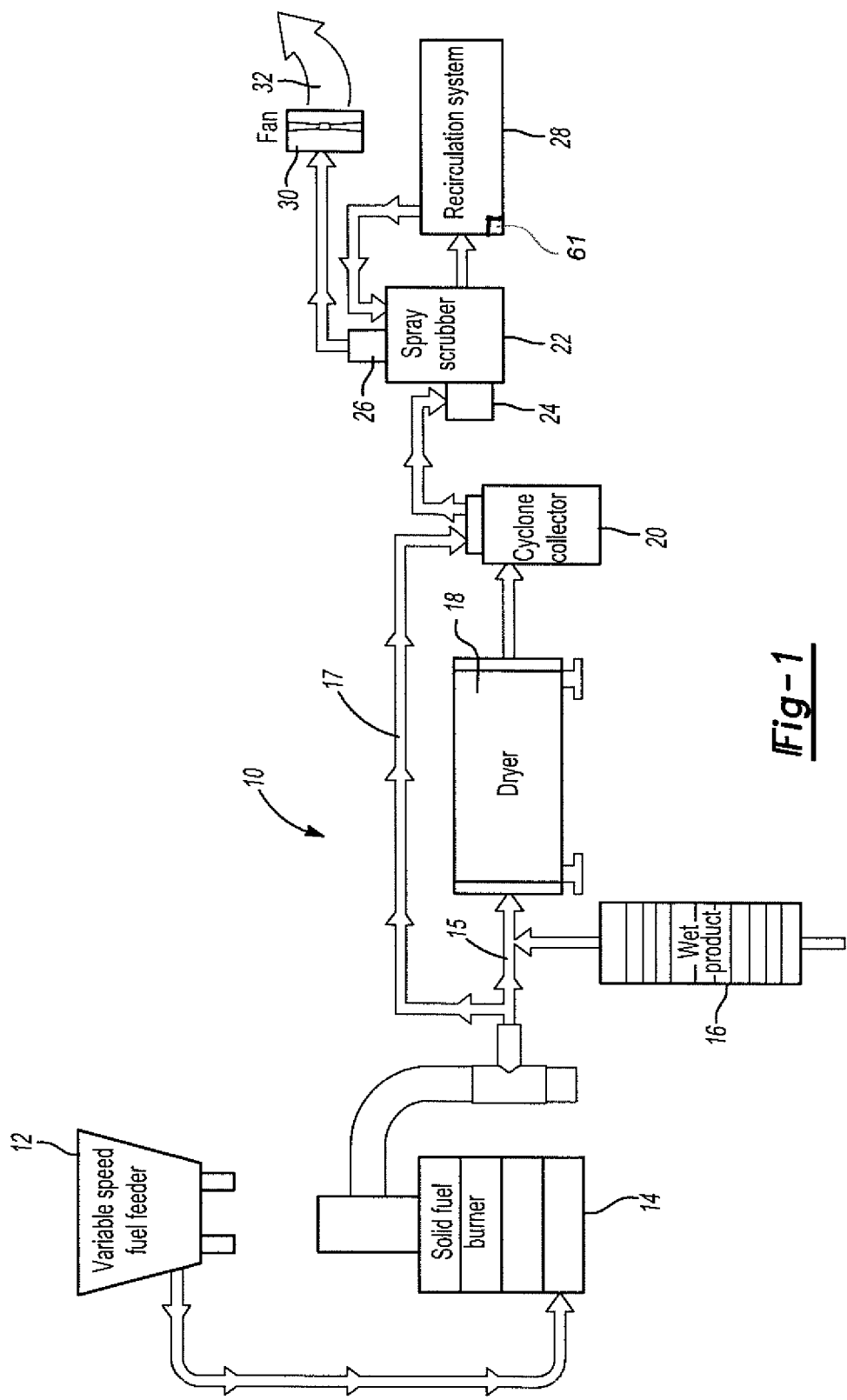
FIG. 1 is a diagram showing the biomass dryer/burner system.

The present invention provides a biomass dryer/burner system which efficiently and effectively dries or burns biomass and subsequently cleans the emissions produced during burning or drying by means of an attached air cleaning apparatus. Emissions produced from the burning or drying process, in turn, heat water used to generate steam, the steam in turn generates electricity. Emissions are carefully scrubbed to eliminate particulate matter and other contaminants before exhausting the air/water mixture to the atmosphere.

The biomass dryer/burner system includes a variable speed fuel burner 12 and a solid fuel burner 14. The burner 14 is a 10 mmBTU per hour cyclonic biomass burner designed to burn construction and demolition waste. The burner 14 is of a wood fired burner type which has a high capacity and produces a temperature of 595°. Biomass material is introduced into one end of the rotary drum on the biomass burner 14. The drum has a diameter of approximately 7 feet and a length of 28 feet.

Primary sources of biomass used in the greenhouse industry are organic materials such as construction and demolition wood waste, clean wood, farm waste such as tomato vines, yard waste from frees, grass clippings and bushes, furniture and green wood generated from the removal of trees.

The burner 14 forces combustion gas and solid particles into the dryer 18, as shown by illustrative arrow 15, and the gasses and dust particulates are moved through the dryer 18 to the cyclone collector 20. Moisture sensors are mounted to the dryer 18 and sense the amount of drying contained within the dryer 18. When the wood chips, which used to be the wet product 16, are sufficiently dried, they are removed from the dryer 18. Dust and particulate matter are removed from the bottom of the cyclone collector 20 and moisture-laden air, or emissions, exits the cyclone collector 20 and enters the spray scrubber unit 22.

In an alternative embodiment, the dryer 18 is bypassed. This embodiment is shown by illustrative arrow 17 wherein emissions and particulate matter from the burner 14 move directly into the cyclone collector 20. In this embodiment, the dryer 18 is completely bypassed whereby no drying of matter takes place. Emissions and particulate matter from the burner 14 are introduced directly into the cyclone collector 20 and onto the spray scrubber 22.

As shown by FIG. 1, the spray scrubber 22 consists of a large stainless steel tank having an inlet 24 on one side near the bottom. The emissions from the cyclone collector 20 are delivered through the inlet 24 to a duct which delivers the emissions into the bottom of the tank of the spray scrubber 22. The spray scrubber 22 may contain water or chemicals to maintain the proper pH. The spray scrubber 22 also contains a plurality of spray mechanisms to spray the emissions from the dryer 18 and the cyclone collector 20. The spray mechanisms (not shown) moisten the emissions to form an air/water mixture. In an alternative embodiment of the spray scrubber 22, the emissions from the drying process are forced through a pool of liquid. Said liquid is often water, chemicals or combination of water and chemicals. The air/water mixture then exits the spray scrubber and enters the recirculation system 28.

The recirculation system 28 cleans, or scrubs, the air/water mixture to provide contaminant levels below a predetermined threshold. These contaminant levels are levels which are safe or exhaust into the atmosphere. These levels are determined by government standards. Sensors are provided for within the recirculation system 28 to measure contaminant levels. If the contaminant levels are above the predetermined threshold, the air/water mixture is returned to the spray scrubber 22 and back into the recirculation system 28 to further clean and scrub the air. If the contaminant levels read by the sensor within the recirculation system 28 are below the predetermined threshold, then the air/water mixture is exhausted. The air/water mixture may be exhausted directly from the recirculation system or by returning the air/water mixture to the spray scrubber and subsequently exiting the spray scrubber through a fan 30. The recirculation system 28 may also include a fan to exhaust the clean air/water mixture.

While in the spray scrubber 22, the emissions move through a restricted passage or orifice to disperse and atomize the water into droplets. In the spray scrubber 22, the incoming emission stream is directed across or through a pool of water. The emissions have a high velocity (approximately 15.2 meters per second or 50 feet per second), creating a large number of liquid droplets. Both particles and gaseous pollutants are collected as they are forced through the liquid pool and impact the droplets. The spray scrubber 22 further includes a sensor adapted to sense emissions entering the spray scrubber 22. Once the sensor contained within the spray scrubber 22 senses emissions, the spray scrubber 22 activates and the emissions are moistened by means of either a pool of water or by means of at least one spray mechanism.

The recirculation system 28 is further comprised of a plurality of elements wherein emissions are pumped through these elements thereby producing air having contaminant levels below the government mandated, predetermined threshold. Various embodiments of the recirculation system 28 are shown in FIGS. 2 and 3. As shown by FIG. 2, emissions 40 from the dryer system 10 are introduced into the spray scrubber 22. An air/water mixture then exits the spray scrubber 22 by means of a pump 42 into a plurality of filters 44 and 46. The filters 44, 46 are appropriate dry/wet filters removing particulates. The filters 44, 46 in series remove different size particulates such as 5 micron particulates and 10 micron particulates. The air/water mixture then exits the filters 44, 46 and enters a collection tank 50.

The collection tank 50 may include water or other chemicals to neutralize the pH of the air/water mixture. The collection tank, in a preferred embodiment, is made of stainless steel. In one embodiment the collection tank 50 may include a plurality of baffle plates 52a, 52b. The baffle plates 52a, 52b facilitate the settling of particulate matter within the collection tank 50. The baffle plates 52a, 52b separate the liquid collected at the bottom of the collection tank 50. In one embodiment, the baffle plates 52a, 52b are planar and arranged generally vertical within the collection tank 50. In an alternative embodiment, the baffle plates 52a, 52b are arranged generally vertical or in a diagonal manner to facilitate contact of the baffle plates 52a, 52b to the air/water mixture. The baffle plates 52a, 52b include passageways allowing liquid to flow from one section with the collection tank 50 to another section. Said passageways may be holes or screening material such as mesh. In an alternative embodiment, the baffle plates 52a, 52b do not provide for any passageways allowing liquid to flow over the baffle plates 52a, 52b. Sediment and water 54 rests on the floor 53 of the collection tank 50. All elements and connecting conduits contained within the recirculation system 28 are pressurized.

Furthermore, the baffle plates 52*a*, 52*b* are provided having an electrical current running through the conductive plates. The electrical current, or electric charge, is provided for by means of a battery, or other power source. The baffle plates 52*a*, 52*b* and the collection tank 50 are both made of a conductive material, such as stainless steel. The electrical current provided within the baffle plates 52*a*, 52*b* is operable to remove dust particulates from the air/water mixture. The baffle plates 52*a*, 52*b* facilitate the removal of contaminates (particulate dust, odors and chemicals) from moist air, specifically an air/water mixture. Previous methods of removing airborne contaminants have been implemented for removal in dry air only. This method provides for removal in an air/water mixture. The baffle plates 52*a*, 52*b* having the electrical current burn dust or other particulate matter contained within the air/water mixture thereby removing the dust or particulate matter from the air/water mixture. Sediment removed from the air/water mixture collects on the floor of the collection tank 50. This sediment is removed once it reaches a high level. Furthermore, the baffle plates 52*a*, 52*b* having the electrical current neutralize odors within the air/water mixture.

The air/water mixture then exits the collection tank 50 and enters the recirculation tank 60. The recirculation tank 60 includes a sensor measuring contaminant levels within the air/water mixture. The contaminant levels measured are often of carbon monoxide. Carbon monoxide, and other contaminant, levels are required to be below a predetermined level before exhausting the air into the atmosphere. The sensor within the recirculation tank 60 measures levels of carbon monoxide to determine whether or not the air meets government standards to be released into the atmosphere. If the contaminant level measured by the sensor within the recirculation tank 60 is above the predetermined government mandated level, then the air/water mixture is recirculated back into the spray scrubber 22 and subsequently pumped through the recirculation system again. If the contaminant levels measured by the sensor within the recirculation tank 60 are below the predetermined government mandated level, then the air/water mixture is pumped by means of a pump 62 and exhausted by means of a fan 64 as shown by the arrow 66.

In one embodiment, the recirculation tank 60 further includes baffle plates 61*a*, 61*b*. The baffle plates 61*a*, 61*b* facilitate the settling of particulate matter within the recirculation tank 60. The baffle plates 61*a*, 61*b* separate the liquid collected at the bottom of the recirculation tank 60. In one embodiment, the baffle plates 61*a*, 61*b* are planar and arranged generally vertical within the recirculation tank 60. In an alternative embodiment, the baffle plates 61*a*, 61*b* are arranged generally vertical or in a diagonal manner to facilitate contact of the baffle plates 61*a*, 61*b* to the air/water mixture. The baffle plates 61*a*, 61*b* include passageways allowing liquid to flow from one section with the recirculation tank 60 to another section. Said passageways may be holes or screening material such as mesh. In an alternative embodiment, the baffle plates 61*a*, 61*b* do not provide for any passageways allowing liquid to flow over the baffle plates 61*a*, 61*b*.

Furthermore, the baffle plates 61*a*, 61*b* are provided having an electrical current running through the baffle plates 61*a*, 61*b*. The electrical current, or electric charge, is provided for by means of a battery, or other power source. The baffle plates 61*a*, 61*b* and the recirculation tank 60 are both made of a conductive material, such as stainless steel. The electrical current provided within the baffle plates 61*a*, 61*b* is operable to remove dust particulates from the air/water mixture. The baffle plates 61*a*, 61*b* facilitate the removal of contaminates (particulate dust, odors and chemicals) from moist air, specifically an air/water mixture. Previous methods of removing airborne contaminants have been implemented for removal in thy air only. This method provides for removal in an air/water mixture. The baffle plates 61*a*, 61*b* having the electrical current burn dust or other particulate matter contained within the air/water mixture thereby removing the dust or particulate matter from the air/water mixture. Sediment removed from the air/water mixture collects on the floor of the recirculation tank 60. This sediment is removed once it reaches a high level. Furthermore, the baffle plates 61*a*, 61*b* having the electrical current neutralize odors within the air/water mixture.

FIG. 3 depicts a situation wherein the sensor of the recirculation tank 60 measured a contaminant level above the predetermined government mandated threshold for contaminant levels. A sensor 61 within the recirculation tank 60 measured above the certain level and thereby pumped the air/water mixture by means of the pump 62 back into the spray scrubber 22 as shown by the arrow 70.

Furthermore, FIG. 3 demonstrates a situation wherein the sensor of the recirculation tank 60 measured a contaminant level below the predetermined level as mandated by the government. The arrow 72 indicates the air/water mixture leaving the recirculation tank 60 by means of a pump 62 and exiting into the environment by means of the fan 64 as shown by the emissions arrow 66.

Furthermore, it is apparent that the above mentioned air purification recirculation system and apparatus may also be used to purify emissions or contaminated air from sources other than a biomass dryer/burner system. The air purification recirculation system and apparatus may be used to purify air within a room to appropriate safety levels. The system may be attached to a burner operable to burn a wide variety of materials such as paint, plastics or other inorganic materials. Furthermore, the system may be attached to a dryer operable to dry a wide range of materials, both organic and inorganic. The system may be adapted to clean and purify any emissions or otherwise contaminated air.

Having thus described my invention, in reference to the preferred embodiment, it is apparent that there may be modifications or variations of the invention which are within the scope of the invention. There are many different materials which may be used within the system, and the biomass dryer/burner system having an air purification apparatus may be in one of a variety of different configurations.

The invention claimed is:

1. A method for cleaning emissions from a biomass modification system to a level in compliance with government regulations for clean air, said method comprising the steps of:
    modifying biomass, the modification process of the biomass producing emissions having a contaminant level;
    spraying emissions exhausted from the modification process with water and chemicals, spraying emissions within a spray scrubber, the spray scrubber producing an air/water mixture;
    filtering the air/water mixture through at least one filter;
    pumping the air/water mixture into at least one collection tank, allowing the air/water mixture to settle thereby leaving a sediment on a floor of the collection tank;
    pumping the air/water mixture into a recirculation tank having a sensor, said sensor measuring the contaminant level; and
    pumping the air/water mixture back to the spray scrubber from the recirculation tank if the contaminant level is above a predetermined level; or
    exhausting the air/water mixture if the contaminant level is below a predetermined level.

2. The method according to claim 1, wherein the biomass is modified by a burner.

3. The method according to claim 1, wherein the biomass is modified by a dryer.

4. The method according to claim 1, wherein the sensor measures carbon monoxide levels.

* * * * *